United States Patent
Mörmann et al.

(10) Patent No.: US 7,629,584 B2
(45) Date of Patent: Dec. 8, 2009

(54) SYSTEM FOR MEASURING IONIZING RADIATION

(75) Inventors: Dirk Mörmann, Bischweier (DE);
Stephen Hirsch, Mannheim (DE);
Ewald Freiburger, Bad Wildbad (DE)

(73) Assignee: Berthold Technologies GmbH & Co. KG., Bad Wildbad (DE)

( * ) Notice: Subject to any disclaimer, the term of this patent is extended or adjusted under 35 U.S.C. 154(b) by 42 days.

(21) Appl. No.: 11/871,417

(22) Filed: Oct. 12, 2007

(65) Prior Publication Data

US 2008/0142718 A1    Jun. 19, 2008

(30) Foreign Application Priority Data

Oct. 12, 2006    (DE)    ........................ 10 2006 048 266

(51) Int. Cl.
*G01T 1/20*    (2006.01)
(52) U.S. Cl. .................................................. 250/361 R
(58) Field of Classification Search .............. 250/361 R
See application file for complete search history.

(56) References Cited

U.S. PATENT DOCUMENTS 4,360,733 A    11/1982    Novak et al.
5,753,919 A    5/1998    Prain et al.
2004/0025569 A1*    2/2004    Damm et al. ................ 73/32 R
2006/0138330 A1*    6/2006    Baldwin et al. .......... 250/357.1

FOREIGN PATENT DOCUMENTS

| DE | 4114030 C1 | 9/1992 |
| DE | 201 03 881 U1 | 6/2001 |
| EP | 0 982 602 A | 3/2000 |
| EP | 0982602 A2 | 3/2000 |
| WO | 01/81950 A | 11/2001 |

\* cited by examiner

*Primary Examiner*—David P Porta
*Assistant Examiner*—Kiho Kim
(74) *Attorney, Agent, or Firm*—Browdy and Neimark, PLLC

(57) ABSTRACT

A system for measuring ionizing radiation with a scintillator incorporates a first assembly of at least two rod-shaped scintillator elements, which can be optically coupled to one another via their opposed face ends. The first assembly of scintillator elements is coaxially enclosed by a second assembly of interconnectable sheath elements. According to the invention, one scintillator element (11), one sheath element (12) and two face-end window elements (131, 132) form a scintillator module (10) in each case, which is optically and mechanically connectable to additional scintillator modules. The individual scintillator elements can thus be produced as encapsulated scintillator modules by means of "suitable" sheath elements and window elements. This provides for a simple and reliable manipulation and assembly of the measuring assembly at the site of its application.

15 Claims, 7 Drawing Sheets

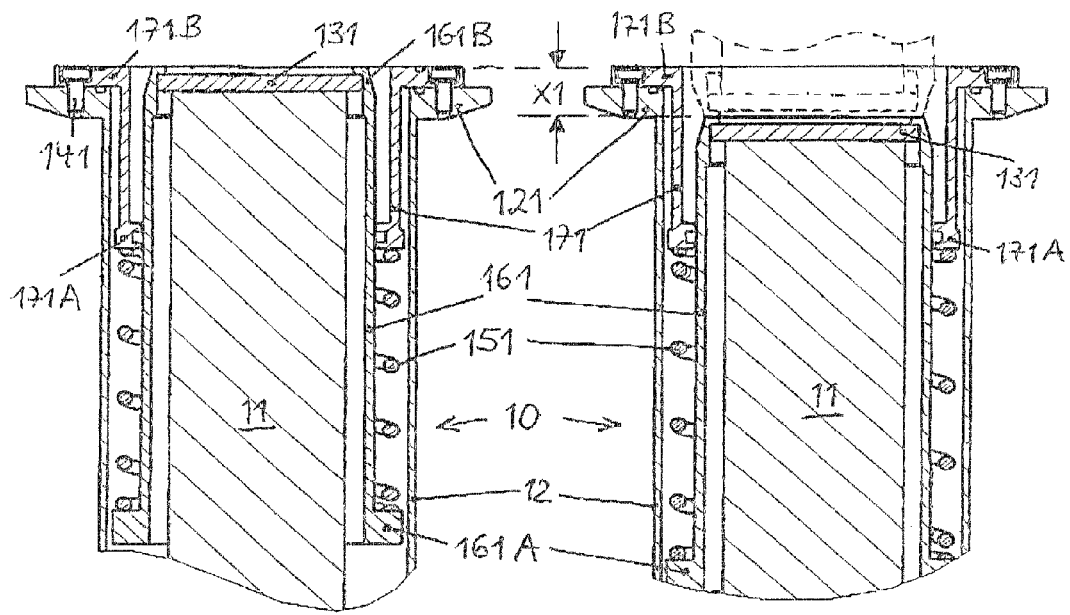
FIG. 1A  FIG. 1B
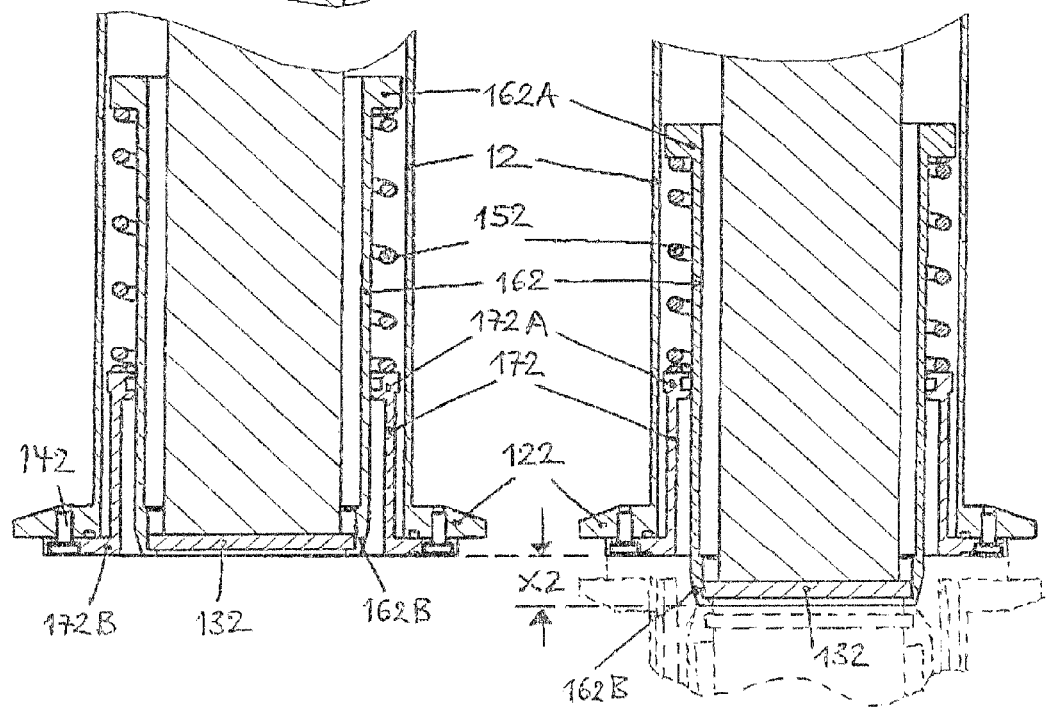

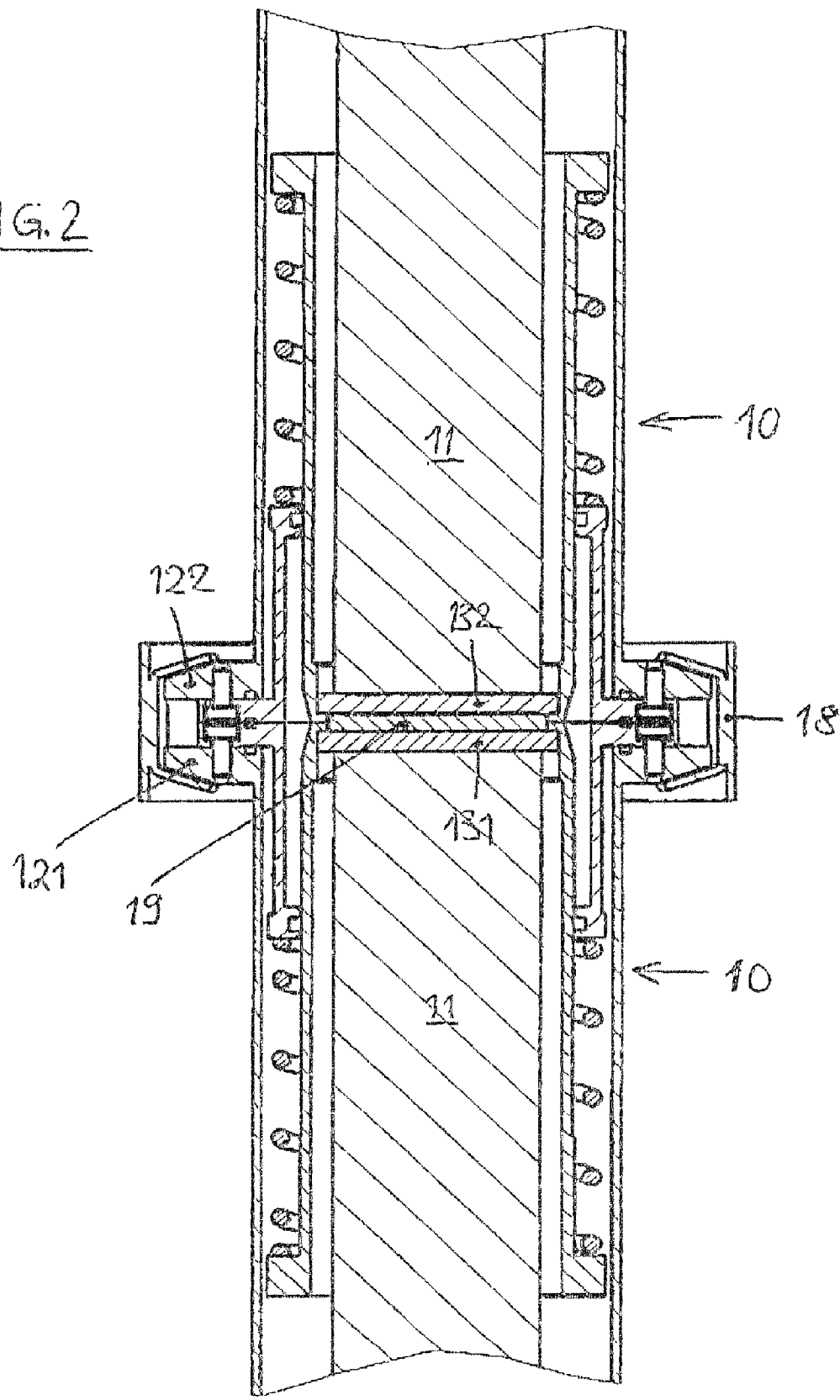

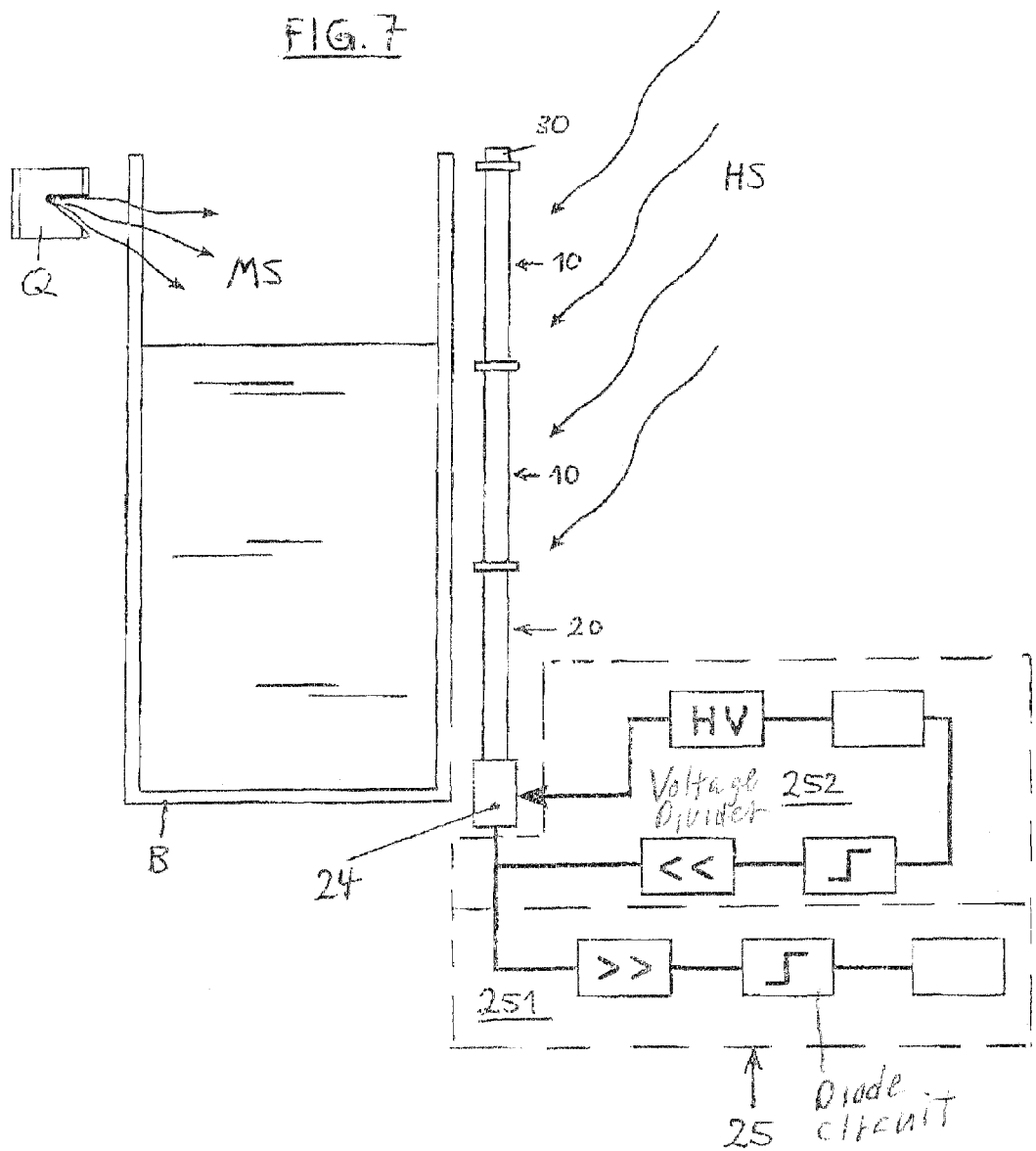

SYSTEM FOR MEASURING IONIZING RADIATION

BACKGROUND OF THE INVENTION

The present invention relates to a system for measuring ionizing radiation, in particular for radiometric level measurements, with a scintillator incorporating a first assembly of at least two rod-shaped scintillator elements, which can be optically coupled to one another via their opposed face ends, a second assembly of interconnectable sheath elements wherein said first assembly of scintillator elements is coaxially enclosed by said second assembly of interconnectable sheath elements, and at least two face-end window elements.

Radiometric level measurements are performed primarily by means of detectors with long organic scintillators, which are coupled at one end to a photomultiplier. The sensitive length of such detectors is limited by the manufacturer of the scintillator material and by practical aspects (production, transportation, assembly) to approximately 2 m. If measurement areas >2 m are required in radiometric level measurements, multiple identical detectors are commonly distributed over the measurement area and are switched in series. The counts from the individual detectors are added together and the fill level is determined based on the calibration. One shortcoming of this approach lies in its high costs, as each detector must be provided with its own amplifier electronic units and evaluation units (e.g. photomultiplier, amplifier circuits, digital component, bus connection). Moreover, the detectors must be connected individually to supply and signal lines.

In the German utility model DE 201 03 881 U1, a rod-type detector is described, in which the sensitive part consists of a plurality of scintillator rods that are placed on top of each other and are optically coupled to each other, and are read out at one end by a single photomultiplier. The advantage of such a detector lies, on the one hand, in the noticeable cost reduction by economies in measuring electronics and wiring and, on the other hand, in a lesser likelihood of a breakdown of the entire measuring system (FMEA number) due to a reduced number of components. In this manner large measurement areas can be covered while at the same time providing for a high degree of sensitivity and linearity. However, the scintillator rods can only be connected once they are on-site. The individual scintillator rods must be aligned relative to each other on-site, optically coupled and placed into a protecting tube. This method is problematic in light of the susceptibility of the scintillator material to soiling and mechanical damage and in light of the oftentimes difficult conditions on-site.

BRIEF SUMMARY OF THE INVENTION

The present invention allows the simplest possible and reliable manipulation and assembly of the measuring system at the location of its application.

To this end, the invention provides a system of the type described at the outset in which one of the scintillator elements, one of the sheath elements and two of the face-end window elements form a scintillator module in each case, which module is optically and mechanically connectable to additional scintillator modules.

The underlying concept of the invention consists in combining the individual scintillator rods by means of "suitable" sheath elements and window elements as face end pieces to form encapsulated scintillator modules.

A scintillator module thus consists of a scintillator rod that is closed off at both ends by windows through which the scintillator light can pass into the next module, as well as of a suitable sheath element.

On-site, multiple scintillator modules of this type are connected to each other until the desired measuring length is reached, and connected at least on one end to a detector module consisting of a scintillator element, photomultiplier and evaluation electronics.

The invention makes possible attainment of a high degree of detection sensitivity for ionizing radiation despite the large measurement area.

This is achieved, in particular, by providing the photomultiplier with an evaluation circuit connected on the load side, which circuit has a measuring channel for detection, processing, and display of the measuring pulses, and a control channel for pulse formation and pulse buffering.

BRIEF DESCRIPTION OF THE DRAWINGS

A preferred exemplary embodiment of the invention will now be described in more detail based on the accompanying drawings, in which:

FIGS. 1A and 1B show a longitudinal section through a scintillator module in two states.

FIG. 2 shows a longitudinal section through the coupling point of two scintillator modules according to FIGS. 1A and 1B.

FIG. 7 shows an example of a measuring assembly with a block diagram of the evaluation circuit of the detector module.

DETAILED DESCRIPTION OF THE INVENTION

The scintillator module 10 shown in FIGS. 1A, 1B, 2 and 3 forms the base module of a measuring system according to the invention.

The function of a scintillator module is to provide for the secure encapsulation of the scintillator element and protection of the same from damage, soiling and scattered light. This is achieved with a robust sheath of stainless steel, which encompasses the scintillator element. Springs affixed at both ends of the scintillator module ensure a reliable optical coupling of the scintillator element to window elements ending at the face ends, and ensure that different dimensional changes of the sheath element and scintillator element, caused by thermal expansion and dimensional tolerances, are compensated for. The position of the scintillator element within the sheath element can be displaced by several centimeters in both directions without jeopardizing its coupling to the adjoining scintillator element or its sealing encapsulation.

Figure 3:
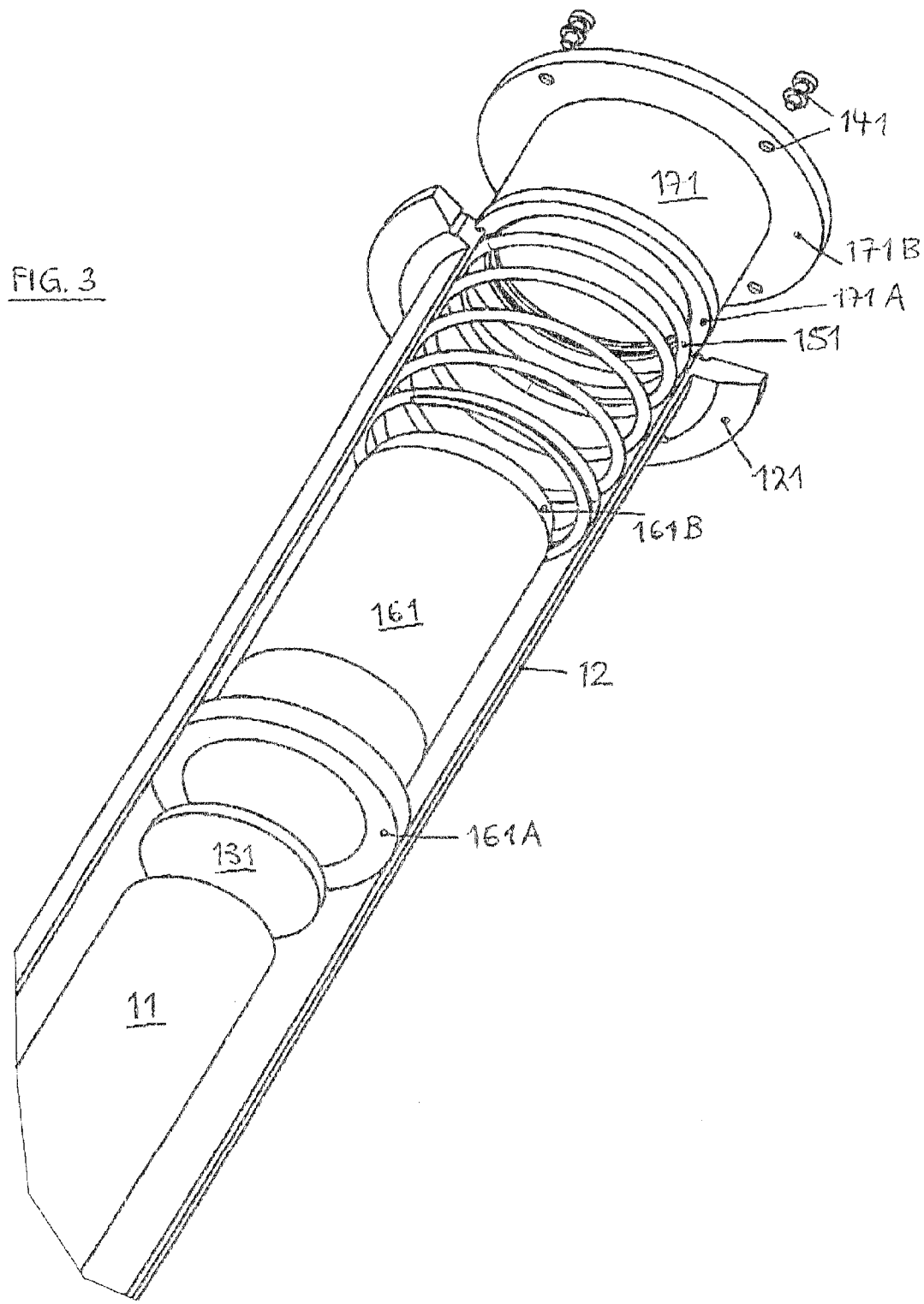
FIG. 3 shows an exploded view of the coupling region of a scintillator module.

The design of a scintillator module will now be described in more detail based on FIGS. 1 through 3:

A rod-shaped scintillator element 11, which is centrally supported in the interior of the scintillator module 10, is coaxially encompassed at its two ends in each case by an inside cylinder 161, 162, an outside cylinder 171, 172 and a common sheath element 12 that is connected to the latter.

Disposed on annular flanges 161B, 162B of the inside cylinders 161, 162 are face-end window elements 131, 132, which seamlessly connect to the two face ends of the scintillator element 11. The other end of each of the inside cylinders 161, 162 has a respective annular flange 161A, 162A that forms the first counter-bearing of a respective spring element 151, 152. The other end of each spring element rests on a respective annular flange 171A, 172A of the associated outside cylinder 171, 172 that slides on the inside cylinder 161, 162 and forms the second counter bearing. The spring elements 151, 152 acting between the two annular flanges 161B or 162B and 171B or 172B permit a length change of the modular unit consisting of the scintillator element 11/inside cylinder 161, 162 relative to the component consisting of the outside cylinder 171, 172/sheath element 12, which, through the pressure action of the spring elements 151, 152, ensures that a relative displacement of the first modular unit relative to the second modular unit is made possible without diminishing, or interrupting, the contact between adjoining window elements 131, 132.

FIG. 1A shows the positioning of the two modular units at a standard temperature; FIG. 1B shows the corresponding positioning of the two modular units at a temperature at which the longitudinal expansion of the sheath elements 12 of the assembly of the scintillator modules 10 is less than the longitudinal expansion of the scintillator elements 11, so that an offset X1, X2 of the outer face ends of the window elements 131, 132 occurs relative to the outer annular surface of the second annular flange of the outside cylinder 171, 172, with x2>x1, but the contact of the window elements 131, 132 with the window elements of the scintillator modules 10 (shown dashed) is maintained.

Figure 4:
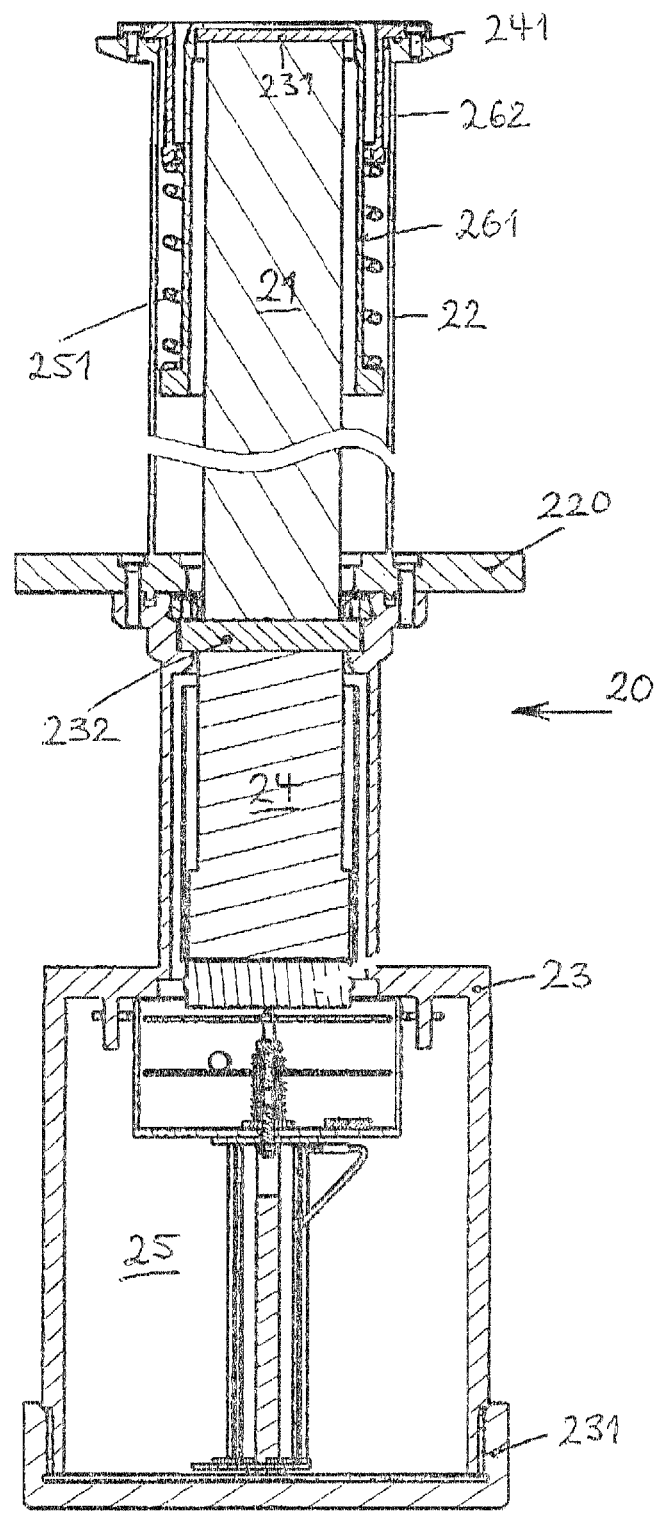
FIG. 4 shows a longitudinal section through the first end region of the embodiment with a coupled-on detector module.
Figure 5:
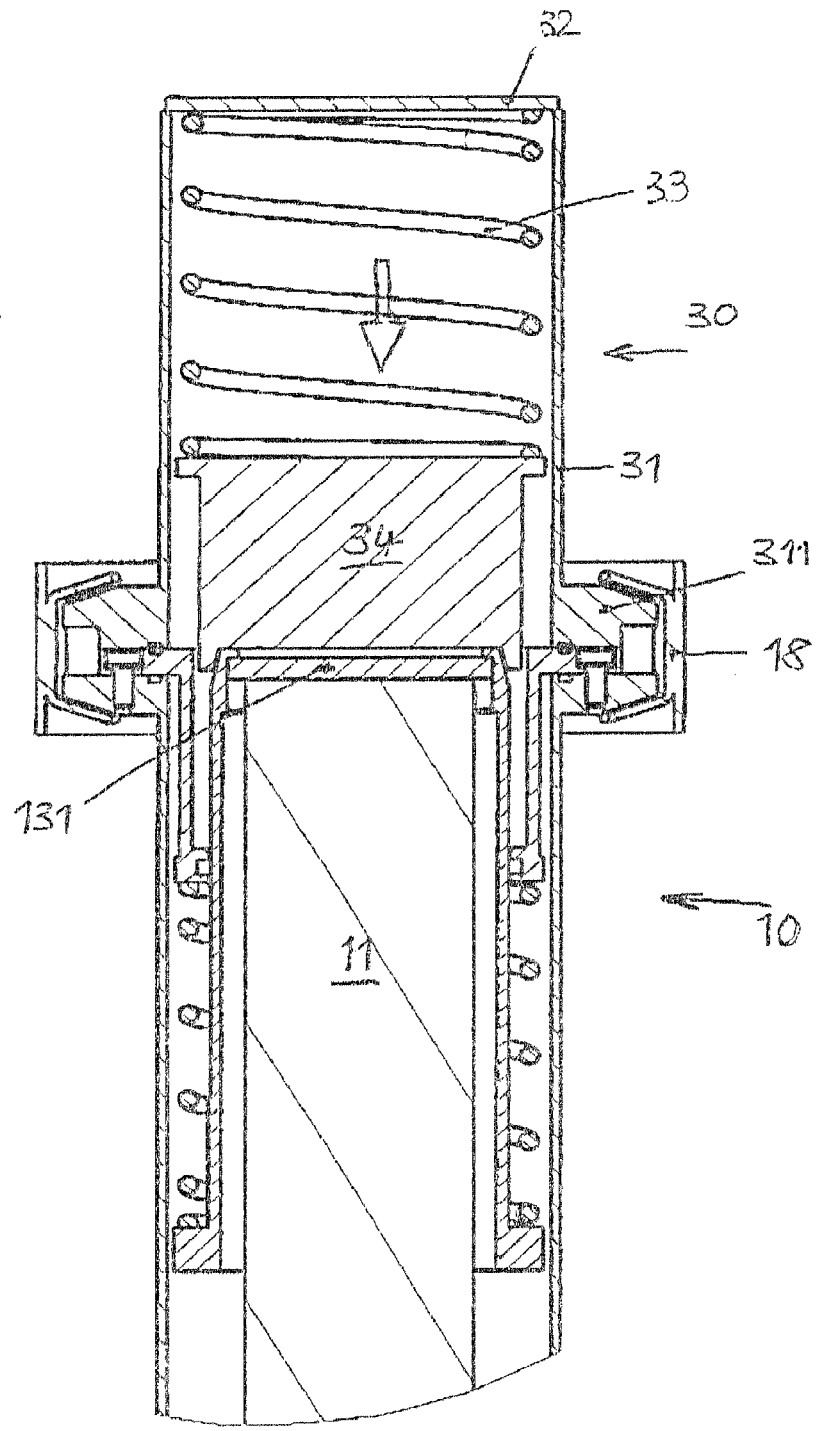
FIG. 5 shows a longitudinal section through the second end region with a coupled-on end module.

In the presented exemplary embodiment, the upper end in FIG. 1B of the scintillator module faces the detector module 20 (FIG. 4), at whose contact point with the first scintillator module 10 no displacement takes place (fixed coupling to its window element 231); the bottom end of the scintillator module faces the end module 30 (FIG. 5). A total length difference N•(x2−x1) occurring with the use of N scintillator modules is compensated for by "insertion" of the "last" scintillator element 11 into the housing 31 of the end module 30 against the force of the compression spring 33.

As shown in FIG. 2, each pair of adjoining scintillator modules 10 that are equipped in this manner are connected to each other via a contoured ring 18 having a generally U-shaped connecting, or clamping, part. A coupling element 19, for example in the form of a silicone plate, which maintains the optical contact between window elements, is inserted between opposed window elements 131, 132.

Sealing elements in flanges 171B, 172B ensure that no light or humidity can enter into the interior of sheath element 12.

The detector module 20 shown in FIG. 4 is, at one end, identical to scintillator modules 10, i.e., one scintillator element 21 is optically coupled to a window element 231 that is transparent to scintillation light and a window element 251 permits a length change of the scintillator element 21 relative to the sheath element 22. Disposed on the side opposite to window element 231, and converting the scintillation light into electronic pulses, are a photomultiplier 24, which is coupled via a detector window 232 to the scintillator element 21, and an evaluation circuit 25.

Referring to FIG. 5, the module facing away from detector module 10 forms an end module 30. Its housing 31 is closed with a cover 32. Disposed inside housing 31 is a compression spring 33, one end of which is supported on cover 32 and the other end of which presses a reflector element 34 against the adjoining window element 131 of the contiguous scintillator module 10, so that scintillation light is reflected from the reflecting end surface of the reflector element 34 back into scintillator element 11.

Figure 6:
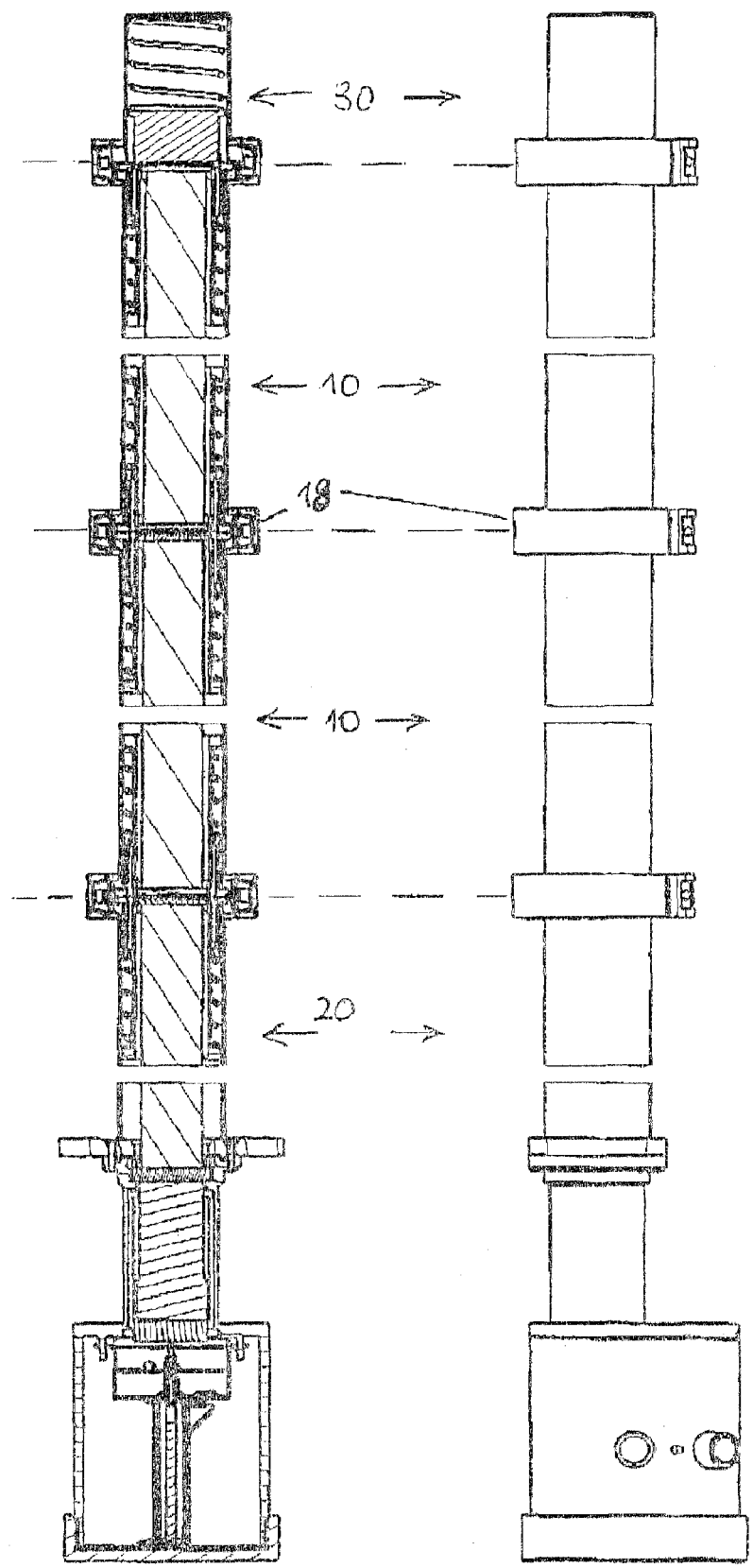
FIG. 6 shows a projection and cross section, respectively, of an overall assembly consisting of an end module, a scintillator module and a detector module.

The scintillator modules, detector module, and end module are simply and quickly connected to each other on-site, mechanically via the contoured rings 18 and optically via the coupling elements 19, as shown in FIG. 6. As explained above, the spring elements in the individual modules ensure that length changes that are caused by temperature fluctuations of at least ±40° C. can be compensated for, while at the same time maintaining the optical contact of the individual elements among each other.

FIG. 7 shows an overall measuring system assembly being used for a fill level measurement in a container B with, for example, a 6-meter measurement area.

A radioactive source Q sends out measuring radiation MS, which penetrates through container B and is attenuated in the process by the substance in the container that is being measured. The radiation is detected on the side across from the source by the inventive system. The same consists, in this case, of one detector module 20 of 2 m length and two scintillator modules 10 each having a length of 2 m, and hence of a total length of 6 m. The light flashes that are generated in the scintillator elements are detected by the photomultiplier 24 in the detector module 20, converted into an electronic signal, and processed by the evaluation circuit 25 to determine the current fill level from the resulting count.

The large, quasi-continuous length of the detector presents a challenge for the dynamics of the electronic amplifier circuit, unlike any that is known from detectors that have been used up to now. In order to attain a high degree of sensitivity of the detector, the goal is to detect even very weak "scintillation light flashes" on the one hand, like those that are generated by Compton scattering in the scintillator material. If this takes place at a large distance from the photomultiplier, the generated light experiences a noticeable weakening as a result of transmission in the scintillator elements and at the optical coupling locations, and therefore triggers only very few electrons at the photocathode of the photomultiplier.

On the other hand, a great deal of scintillation light is generated by muons or cosmic radiation HS, which travel through up to 6 m scintillator length and have the effect that the resulting voltage pulses at the anode of the photomultiplier can reach very high levels.

FIG. 7 also shows a circuit diagram of the evaluation circuit 25, with which these problems are overcome.

To prevent an overdriving of the electronics unit, but to also, on the other hand, still be able to detect even weak scintillation light, the signals are divided from the anode of the photomultiplier 24 onto two channels that are independent of each other:

The first channel is a measuring channel 251 that is optimized for the signal processing of the pulses, which are crucial for the measurement, and has an electronic amplification of approximately 30. At the input of the measuring channel 251 the pulse height is limited by means of a suitable diode circuit, to prevent overdriving effects.

The second channel is a control channel 252, which is responsible for the automatic high voltage regulation. Channel 252 has a voltage divider, which decreases the pulse height at the input by a factor of approximately 5-10. The control channel 252 does not have any amplification but serves only for the purpose of pulse formation and buffering.

This ensures that the required dynamic range is maintained under all operating conditions. The regulation of the high voltage HV for operating the photomultiplier to compensate for aging and temperature effects utilizes a method known per se, for example as disclosed in the patent document DE 41 14 030 C1.

This application relates to subject matter disclosed in German Application number 10 2006 048 256.2, filed on Oct. 12, 2006, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A system for measuring ionizing radiation comprising a scintillator that comprises: a first assembly of at least two rod-shaped scintillator elements, which can be optically coupled to one another via their opposed face ends; a second assembly of interconnectable sheath elements, wherein said first assembly of scintillator elements is coaxially enclosed by said second assembly of interconnectable sheath elements; and at least two face-end window elements, wherein said first and second assemblies and said face end window elements form at least two scintillator modules each composed of one respective scintillator element having a length dimension, one respective sheath element having a length dimension parallel to the length dimension of said one respective scintillator element and two of said face-end window elements, each said module being optically and mechanically connectable to additional scintillator modules, wherein at least one of said scintillator modules further comprises at least one spring element interposed between said scintillator element and said sheath element of said at least one of said scintillator modules, said spring element being disposed parallel to the length dimensions of said scintillator element and said sheath element to permit a relative displacement between said scintillator element and said sheath element.

2. The system according to claim 1, further comprising a detector module situated at a first end of the system and comprising a light sensor.

3. The system according to claim 2, wherein said detector module has at least one window element, and said system further comprises light-permeable coupling elements inserted between window elements of said scintillator modules and said detector module.

4. The system according to claim 2, wherein said light sensor comprises a photomultiplier.

5. The system according to claim 1, further comprising an end module situated at a second end of the system.

6. The system according to claim 5, wherein:
said end module comprises a housing provided with a flange, a cover, a reflector element and a compression spring;
at least one of said scintillator modules further comprises an inside cylinder having an outer annular flange; and
said system further comprises a contoured ring for connecting said flange of said end module to said at least one of said scintillator modules, and
wherein said compression spring is adapted to push said reflector element against said outer annular flange of said inside cylinder of said at least one of said scintillator modules.

7. The system according to claim 1, wherein said at least one of said scintillator modules further comprises an inside cylinder having a first annular flange and an outside cylinder having a first annular flange surrounding said scintillator element, said outside cylinder surrounding said inside cylinder, and said spring element is a helical spring having opposed ends that are supported on said first annular flanges.

8. The system according to claim 7, wherein:
said inside cylinder has two opposed ends and a second annular flange at one of said ends, said second annular flange holding one of said window elements of said at least one of said scintillator modules;
said scintillator element of said at least one of said scintillator modules has a face end that is supported against said one of said window elements; and
said first annular flange of said inside cylinder is located at the other one of said ends of said inside cylinder.

9. The system according to claim 7, wherein:
said outside cylinder has two opposed ends and a second annular flange on one of said ends;
said first annular flange of said outside cylinder is located at the other one of said ends of said outside cylinder;
said sheath element has an end flange; and
said at least one of said scintillator modules further comprises retaining elements connecting said second annular flange of said outside cylinder to said end flange of said sheath element.

10. The system according to claim 1, wherein:
said sheath element of each of said two modules has an end flange; p1 said two modules are disposed to adjoin one another with said end flanges facing one another; and
said system further comprises contoured rings that are laterally lockable to, and hook around, said end flanges of the adjoining modules in a form-fitting manner to mechanically connect said two modules together.

11. The system according to claim 1, wherein: said at least one spring element is disposed coaxially with respect to said scintillator element and said sheath element.

12. A system for measuring ionizing radiation comprising a scintillator that comprises: a first assembly of at least two rod-shaped scintillator elements, which can be optically coupled to one another via their opposed face ends; a second assembly of interconnectable sheath elements, wherein said first assembly of scintillator elements is coaxially enclosed by said second assembly of interconnectable sheath elements; and at least two face-end window elements, wherein said first and second assemblies and said face end window elements form at least two scintillator modules each composed of one respective scintillator element having a length dimension, one respective sheath element having a length dimension parallel to the length dimension of said one respective scintillator element and two of said face-end window elements, each said module being optically and mechanically connectable to additional scintillator modules, wherein:
said system further comprises a detector module situated at a first end of the system and comprising a light sensor;
said light sensor comprises a photomultiplier; and
said detector module further comprises:
a scintillator element having two opposed ends;
a sheath element having an end flange;
a spring element coupling one end of said scintillator element and said sheath element to each other;
an inside cylinder;
an outside cylinder;
a detector window;
an evaluation circuit; and
a housing containing said evaluation circuit and said photomultiplier, and
wherein said scintillator element is coupled at its other end via said detector window to said photomultiplier, and said housing is held on said end flange of said sheath element.

13. A system for measuring ionizing radiation comprising a scintillator that comprises: a first assembly of at least two rod-shaped scintillator elements, which can be optically coupled to one another via their opposed face ends; a second assembly of interconnectable sheath elements, wherein said first assembly of scintillator elements is coaxially enclosed by said second assembly of interconnectable sheath elements; and at least two face-end window elements, wherein sad first and second assemblies and said face end window elements form at least two scintillator modules each composed of one respective scintillator element having a length dimension, one respective sheath element having a length dimension parallel to the length dimension of sad one respective scintillator element and two of said face-end window elements, each said module being optically and mechanically connectable to additional scintillator modules, wherein:
said system further comprises a detector module situated at a first end of the system and comprising a light sensor;
said light sensor comprises a photomultiplier; and
wherein:
said photomultiplier has a load side; and
said system further comprises an evaluation circuit connected at said load side, said evaluation circuit comprising a measuring channel for detection, processing, and display of measuring pulses from said photomultiplier, and a control channel adapted for pulse formation and pulse buffering.

14. The system according to claim 13, wherein said measuring channel has an amplifier with an electronic amplification factor of approximately 30, and pulse-height limiting means.

15. The system according to claim 13, wherein said photomultiplier has a high voltage unit, and said control channel is operative to reduce the height of pulses from said photomultiplier via a voltage divider by a factor of 5-10, and is connected to use the output from said voltage divider to actuate said high voltage unit.

* * * * *